Figure 1:
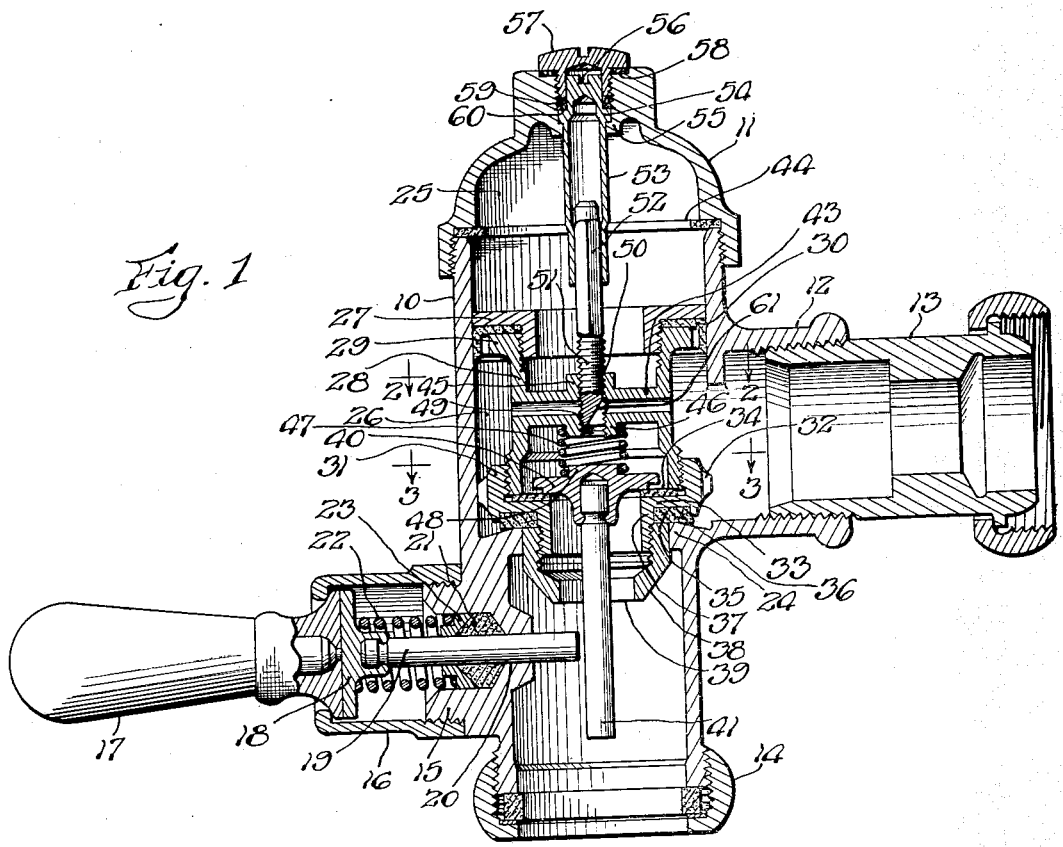

June 26, 1934.    A. C. DOBRICK    1,964,111

FLUSH VALVE

Filed July 18, 1929

Inventor:
August C. Dobrick,
John Howard McElroy,
By his Atty.

Patented June 26, 1934

1,964,111

UNITED STATES PATENT OFFICE 1,964,111

FLUSH VALVE

August C. Dobrick, Chicago, Ill., assignor to The Imperial Brass Manufacturing Company, Chicago, Ill., a corporation of Illinois Application July 18, 1929, Serial No. 379,241

8 Claims. (Cl. 137—93)

My invention is concerned with flush valves for toilets, etc., and is designed to produce a simple structure of the class described that will be durable and efficient in operation, and which can be easily adjusted to regulate the amount of water that is discharged with each flush without the necessity of opening up the valve.

To these ends, it consists of the structure hereinafter fully described, the novel features and combinations of elements being particularly pointed out in the claims.

To illustrate my invention, I annex hereto a sheet of drawing, in which the same reference characters are used to designate identical parts in all the figures, of which,—

Fig. 1 is a central vertical longitudinal section through the valve; and

Figure 3:
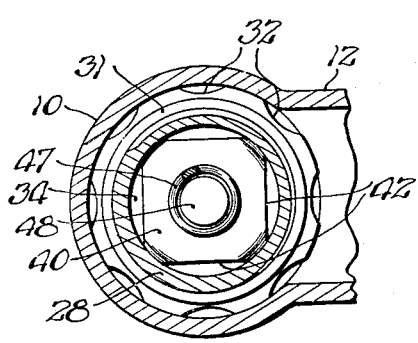
Figure 2:
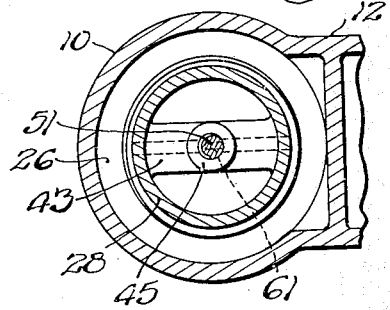

Figs. 2 and 3 are horizontal transverse sections on the lines 2—2 and 3—3, respectively, of Fig. 1.

In carrying out my invention in its preferred form, I provide a generally cylindrical body casting 10, the upper end of which is closed with the cap 11 screwed thereon, beneath which, at one side, is the inlet boss 12, into which is screwed the inlet connecting tube 13. The threaded bottom is provided with the outlet connection 14, and above the same is the threaded boss 15, upon which is screwed the barrel 16 for the tilting handle 17, which has its flat inner end co-operating with the circular head 18 of the valve-operating rod 19 sliding through the aperture 20 to the interior of the casing, this aperture 20 being provided with the packing 21 surrounding the rod 19 and compressed in place by the spring 22 acting through the packing sleeve 23 in the customary manner. This helically-coiled expanding spring 22, reacting against the head 18, has the further function of holding the tilting handle 17 in its normal horizontal, inoperative position. The casing 10 is provided, between the inlet and outlet ports, with the inwardly projecting flange 24 which forms the seat for the main valve.

The portion of the interior of the cylinder above this valve seat 24 is divided into what I may call the controlling chamber 25 and the receiving chamber 26 by the reciprocating valve mechanism hereinafter described, the movement of the valve mechanism serving to vary the capacity of the controlling chamber, as will be readily apparent. This reciprocating valve mechanism consists of the piston portion formed by the clamping ring 27 co-operating with the internally-threaded upper end of the hollow cylinder 28, which has the outwardly extending flange 29 on its upper end, between which and the horizontal flange portion of the ring 27 is clamped the leather cup 30 which makes the piston water-tight. The lower end of the cylinder 28 is externally threaded and has screwed thereon the valve member or ring 31, which has its periphery notched, as seen at 32, to permit the water in the receiving chamber to pass it as it rises until the main valve is opened. The upper portion of an inwardly projecting annular flange or web portion 33 forms an internal valve seat for the auxiliary valve, which seat will be provided with the gasket 34 clamped thereon by the lower end of the cylinder 28 as the valve member is screwed in place. The under side of this flange 33 has the annular channel 35 therein, which receives the annular valve gasket 36 which co-operates directly with the seat 24 of the main valve. The valve member 31 has the reduced downwardly-projecting portion 37, upon which is screwed the guiding ring 38, the larger, upper end of which fits in the port about the seat 24, while its lower end 39 is tapered as shown.

Co-operating with the auxiliary valve-seat gasket 34 is the auxiliary tilting valve-head 40, which has the stem 41 projecting downwardly therefrom into the path of the rod 19 when the latter is pushed in by operating the handle 17. Assuming that the controlling chamber is filled with water under the same pressure as the water in the receiving chamber, when the handle 17 is tilted, the operation will be as follows:

Tilting the handle 17 forces the rod 19 inwardly, engaging the valve stem 41 and tilting the valve 40. As seen in Fig. 3, this valve head has segmental portions cut off at 42 so that when it is tilted, water can flow freely through the open inner portion of the hollow cylinder 28, which inner portion is obstructed only by the transversely-extending tube 43, preferably formed integrally therewith. The water in the controlling chamber 25 being thus discharged into the outlet, the pressure on the piston 27 is unbalanced, and it will rise until it reaches the packing ring 44 held between the upper end of the casing 10 and the cap 11. As soon as the main valve is opened, the water rushes rapidly from the inlet through the receiving chamber and down through the outlet, and this flush continues until the controlling chamber 25 is refilled by the means to be now described.

The tube 43 has formed on its upper end the boss 45 and on its lower end the boss 46, which boss 46 is utilized as an abutment to hold the helically-coiled expanding spring 47 in place. The lower end of this spring co-operates with the lug 48 formed on the upper end of the tilting valve body for this purpose, so that the tilting valve will be returned to its normal position as soon as the rod 19 returns to its normal position. An aperture 49 is formed in the boss 46, and the boss 45 has a threaded aperture 50 into which is screwed the threaded lower end of the rod or screw 51, the upper end of which is preferably hexagonal in cross section and fits into the hexagonal lower end 52 of the sleeve 53, which has at its upper end the annular flange 54 seated to turn on the annular flange 55 formed at the bottom of the opening in the top of the cap 11. The upper end of the sleeve 53 is closed and reduced in cross section, and provided with means for applying a tool thereto to turn it, such as the slot 56 for a screwdriver.

The upper portion of the opening in the end of the cap is screw-threaded, and the cap screw 57 is screwed therein and made water-tight by the gasket 58 between its head and the top of the cap 11 and by the packing 59 between the bottom of the cap screw and the flange 60 formed where the upper end of the sleeve 53 is reduced. The lower end of the screw 51 may be tapered, or it may have the tapering cut 61 therein. When the main valve is raised, the water in the receiving chamber enters the ends of the tube 43 and passes out through the narrow part formed by the recess 61 in the lower end of the screw 51, and rises and fills the chamber 25, the now unbalanced pressure forcing the piston down slowly as the chamber 25 is filled, and it will be obvious that by turning the screw 51, and thus regulating the working size of the filling passage, the time that it takes to fill the controlling chamber 25, and thus the consequent amount of water at each flush, may be regulated without the necessity of opening the valve casing, by simply removing the cap screw 57.

While I have shown and described my invention as embodied in the form which I at present consider best adapted to carry out its purposes, it will be understood that it is capable of modifications and that I do not desire to be limited in the interpretation of the following claims except as may be necessitated by the state of the art.

What I claim as new, and desire to secure by Letters Patent of the United States, is:

1. In a flush valve, the combination with a valve seat casing having inlet and outlet ports and a main-valve seat between them, of a main valve movable thereinto and from the seat, a piston sliding in a cylindrical part of the casing above the valve seat and separating the cylinder into a receiving chamber and a controlling chamber, a hollow cylinder connecting the valve with the piston, an auxiliary-valve seat in said cylinder, an auxiliary valve co-operating with said seat and serving to open a discharge passage from the controlling chamber to the outlet port, means for operating said auxiliary valve to permit a quick discharge from the controlling chamber permitting the head of water to unseat and lift the main valve, and a small filling passage for the controlling chamber located in a tube extending transversely through the body of the hollow cylinder connecting the piston and the main valve.

2. A flush valve constructed as described in claim 1, provided with regulating means for the filling passage consisting of a screw threaded into the tube and controlling the size of the outlet therefrom into the inside of the cylinder.

3. A flush valve constructed as described in claim 1, provided with regulating means for the filling passage consisting of a screw threaded into the tube and controlling the size of the outlet therefrom into the inside of the cylinder and, a sleeve extending through the casing and rotatable therein and having a telescoping and non-rotating connection with the screw.

4. In a flush valve, the combination with a valve casing having inlet and outlet ports and a main-valve seat between them, of a main valve movable therein to and from the seat, a member connected with said main valve separating the casing above the valve seat into a controlling chamber and a receiving chamber and movable to vary the capacity of the controlling chamber, an auxiliary-valve seat in the main valve for an auxiliary valve controlling a capacious discharge passage through said member from the controlling chamber to the outlet port, said auxiliary valve in the member co-operating with said seat, means for opening the auxiliary valve without directly moving the main valve to permit a quick discharge from the controlling chamber thereby permitting the head of water to unseat and lift the main valve, a small filling passage for the controlling chamber from the inlet port through the center of said member, and means to regulate the effective size of said filling passage, which effective size remains constant throughout the cycle of operations.

5. A flush valve constructed as described in claim 4 in which the regulating means for the filling passage consists of a screw threaded into the filling passage and provided with an elongated telescoping non-rotatable connection with a sleeve extending through the casing and rotatable therein.

6. A flush valve constructed as described in claim 4 in which the regulating means for the filling passage consists of a screw threaded into the filling passage and provided with an elongated telescoping non-rotatable connection with a sleeve extending through the casing and rotatable therein, said sleeve having toward its closed outer end a flange adapted to be seated on a flange in the opening through the casing, and a reduced end portion provided with means for applying a tool thereto and normally covered by a cap screw-threaded into the opening and compressing packing about the sleeve.

7. In a flush valve mechanism, the piston and sleeve member consisting of a hollow cylindrical body having a flange at its upper end and internally threaded, a ring having a flange above the body-flange threaded into the top of the body, a leather cup secured between the flanges, a hollow valve member threaded onto the bottom of the body and having an internal auxiliary-valve seat therein within the body, a gasket clamped upon said seat between the lower end of the body and the valve member when it is screwed in place, a hollow guide piece screwed onto the lower end of the valve member, and an external main-valve gasket clamped in place between the guide piece and the valve member, the piston and sleeve member having formed therein a tube extending transversely through the body thereof and provided with an outlet port from the central portion thereof.

8. In a flush valve, the combination with a valve casing having inlet and outlet ports, and a main-valve seat between them, of a main valve movable therein to and from the seat, a member connected with said main valve separating the casing above the valve seat into a controlling chamber and a receiving chamber and movable to vary the capacity of the controlling chamber, an auxiliary-valve seat in the main valve for an auxiliary valve controlling a capacious discharge passage through said member from the controlling chamber to the outlet port, said auxiliary valve in the member cooperating with said seat, means for opening the auxiliary valve without directly moving the main valve to permit a quick discharge from the controlling chamber thereby permitting the head of water to unseat and lift the main valve, a small filling passage for the controlling chamber from the inlet port through the center of said member, and means to regulate the effective size of said filling passage operable from the exterior of the casing.

AUGUST C. DOBRICK.